April 11, 1961  L. J. SIRI  2,979,586
CLAMP-ON TEMPERATURE RESPONSIVE DEVICE
Filed July 6, 1959  3 Sheets-Sheet 1
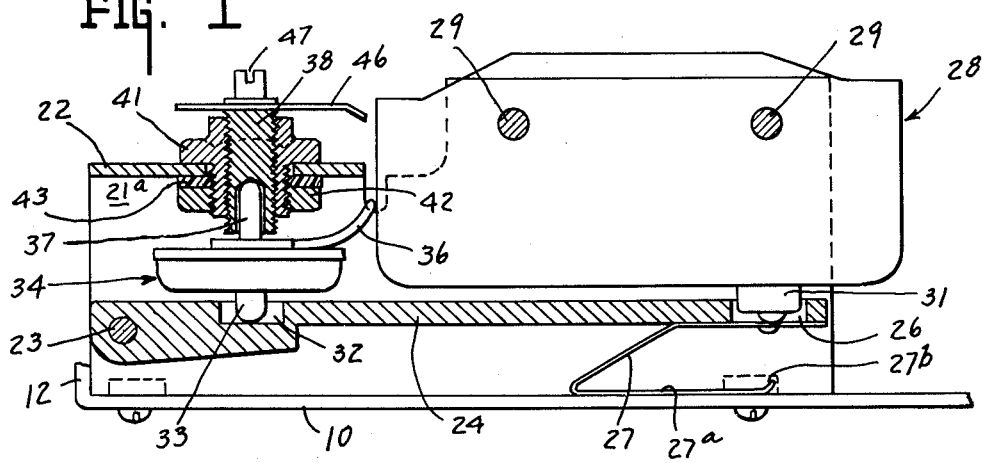
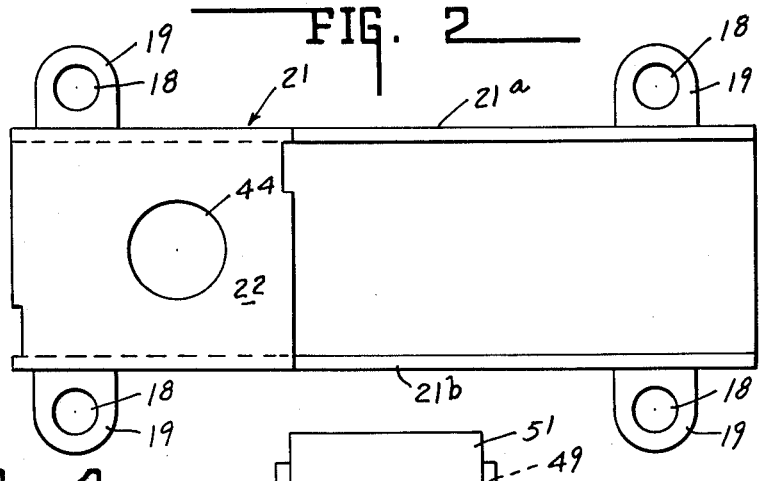
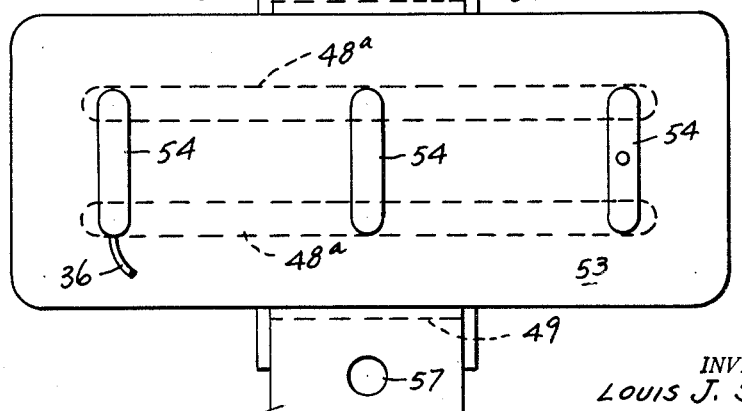
INVENTOR.
LOUIS J. SIRI.
BY
Lockwood, Woodard, Smith & Weikart.
ATTORNEYS.

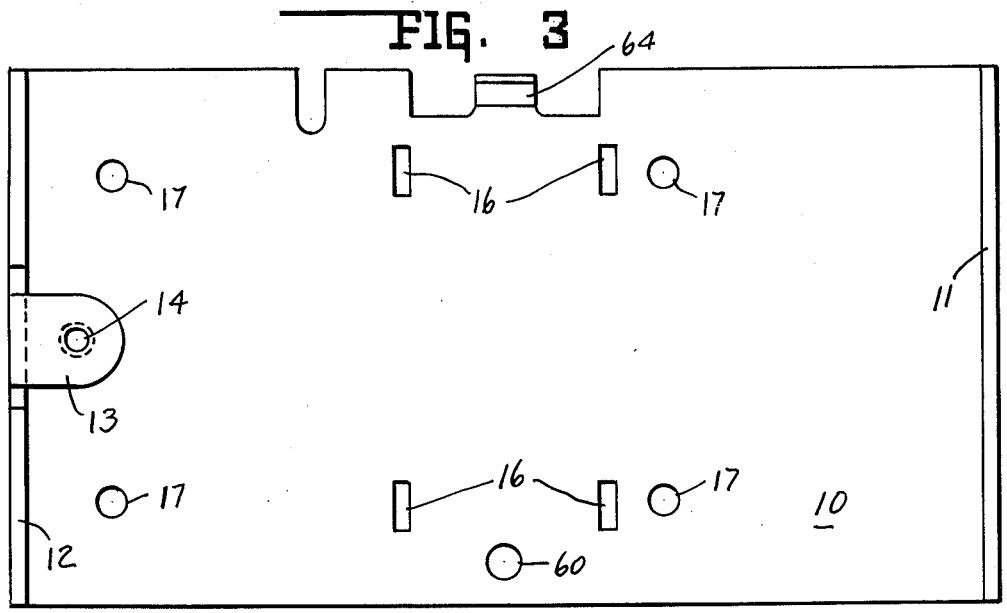
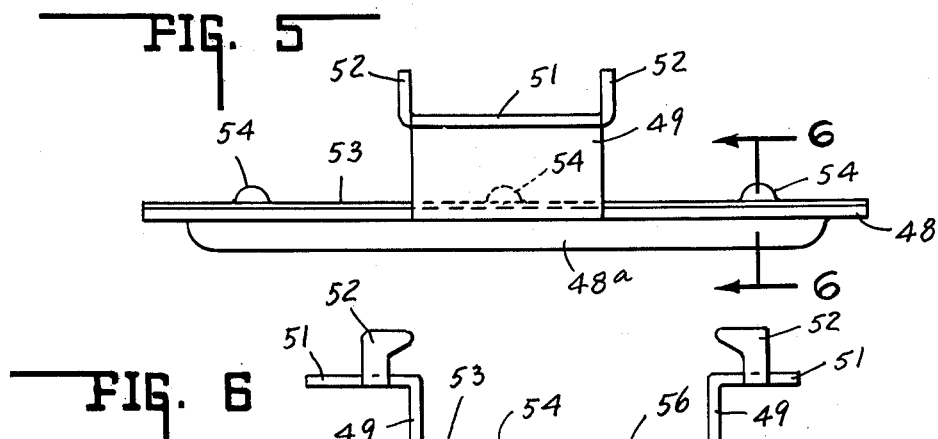
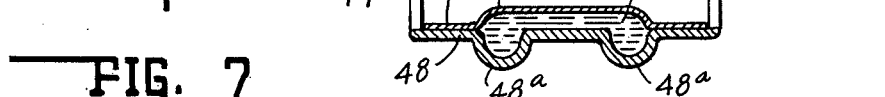
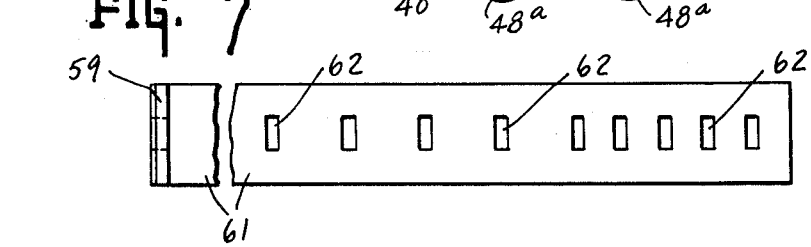

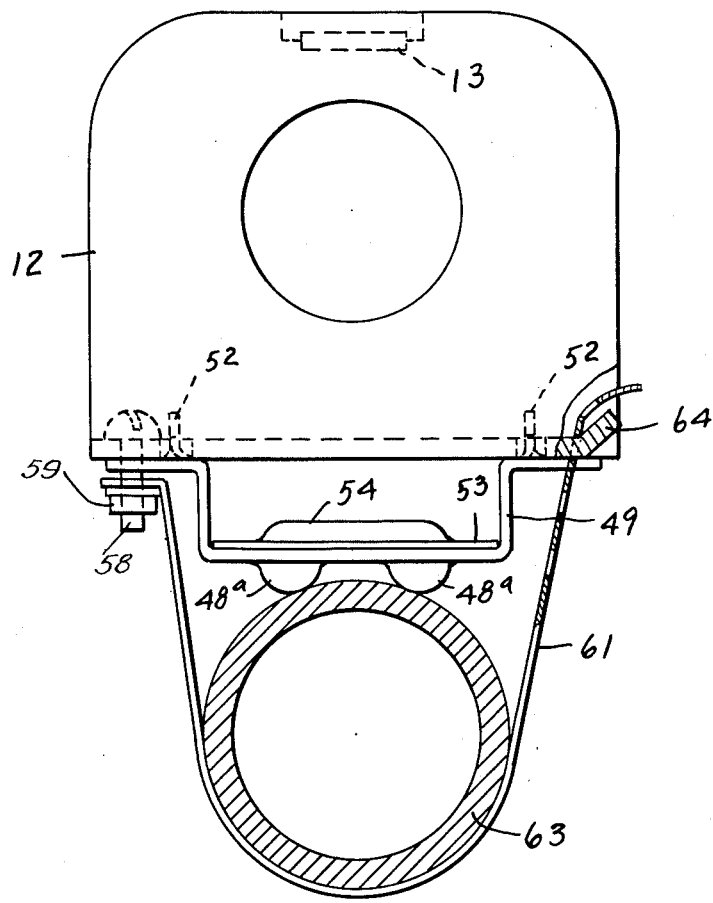

United States Patent Office 2,979,586
Patented Apr. 11, 1961

2,979,586
CLAMP-ON TEMPERATURE RESPONSIVE DEVICE
Louis J. Siri, South Bend, Ind., assignor to Penn Controls, Inc., Goshen, Ind.
Filed July 6, 1959, Ser. No. 825,023
5 Claims. (Cl. 200—140)

This invention relates generally to temperature responsive devices and in particular to a temperature sensing element for a thermally responsive switching mechanism of the liquid expansion type.

The present invention is embodied in the temperature sensing portion of a liquid charged system which is utilized to actuate a switching mechanism in response to temperature variations at the sensing element. The element is formed by two overlying plates having intersecting cavities therein, with the lower plate being formed so as to support the switching mechanism. The cavities in the lower plate are formed so that the plate may be rigidly clamped in good heat conducting relation with either a flat surface or a curved surface, such as presented by a pipe or tube.

An object of the present invention is to provide a temperature sensing element of the type referred to which is an integral part of the switch mechanism supporting structure.

A further object of the present invention is to provide a sensing element of the type referred to which is rigid and strong and which has a relatively large surface area to volume ratio thereby providing excellent sensitivity of response.

A further object of the present invention is to provide a strap-on type control device which is constructed so as to resist deformation when tightly mounted on a supporting surface.

A further object is to provide a switching device utilizing a pivotally supported operating lever which is biased in one direction by a resilient blade, the blade being formed and mounted so as to resist movement of the lever in one direction by a force dependent on both the resistance to deformation of the blade and the friction generated between the blade and an adjacent stationary surface.

The full nature of the invention will be understood from the accompanying drawings and the following descriptions and claims:

Fig. 1 is a sectional side view showing a portion of the structure embodying the present invention.

Fig. 2 is a top plan view of the housing structure.

Fig. 3 is a top plan view of the case.

Fig. 4 is a top plan view of the sensing element component of the structure.

Fig. 5 is a side view of the structure shown in Fig. 4.

Fig. 6 is a sectional view taken generally along the line 6—6 of Fig. 5.

Fig. 7 is a top plan view of the strap for clamping the structure to a pipe, tube or the like.

Fig. 8 is a top view of the structure shown clamped in place upon a pipe or tube.

Referring initially to Figs. 1, 2 and 3, there is shown at 10 a case which is generally rectangular in configuration and is provided with upturned ends 11 and 12 as may be seen in Fig. 3. The upper margin of the end 12 may be provided with an inturned tab 13 having a threaded aperture 14 therein for anchoring a snap-on cover (not shown). As will be evident from Fig. 3 the case 10 is further provided with four slots 16 adapted to receive a supporting structure to be subsequently described. The case is further provided with apertures 17 which register with apertures 18 formed in sidewardly extending tabs 19 which are integral with a housing 21 shown in detail in Fig. 2. The housing includes side plates 21a and 21b which are bridged, adjacent one end by an integral plate 22. Side plates 21a and 21b are apertured to receive a pivot pin 23 which supports for pivotal movement a motion transmitting lever 24. The lever 24 extends longitudinally through the housing and has an aperture 26 adjacent its free end.

Riveted to the free end of the lever and closing the lower end of the aperture is a resilient blade 27. The blade is generally U-shaped and the outer face of its remote leg 27a has a sliding engagement with the adjacent inner face of the case 10, the free end of the leg 27a being upturned, as indicated at 27b.

Supported between the side plates 21a and 21b is an enclosed switch structure indicated generally at 28, the switch structure being held by means of screws 29. The switch structure may be of a conventional, preferably normally open, type, its specific structure not being described in detail herein since it forms no part of this invention. The switch structure is provided with a thrust pin 31 which is urged outwardly and which can be moved inwardly against an internal resisting force for snapping the switch into contacts closed position. The thrust pin 31 extends through the aperture 26 and bears against the blade 27.

Adjacent its supported end the lever 24 is provided with a depression 32 which receives an actuating pin 33 of a diaphragm-type power element indicated generally at 34. The power element is of conventional type having one movable wall and filled with a thermally expansive fluid. A capillary bore tube 36 communicates with the interior of the power element. It will be understood that an increase in fluid pressure in the power element serves to displace the pin downwardly, as viewed in Fig. 1, thereby pivoting the lever 24 clockwise. A pin 37 extends from the rear of the rigid face of the power element and is received within an accommodating depression formed in the lower end of a stud 38. The stud is externally threaded and is received within a bushing 39 having an integral hexagonal portion 41. The threaded lower end of the bushing receives a nut 42 and lock washer 43. The bushing extends through the aperture 44 (Fig. 2) in the bolt 22 and nut 42 tightened on the bushing, this assembly being thus held rigidly upon the plate 22. The upper end of the stud 38 may be provided with a pointer 46 for indicating the degree of rotation of the stud with relation to the bushing. The extreme upper end of the stud may be provided with a screwdriver slot 47 to facilitate rotation of the stud within the bushing. It will be understood that by rotating the stud, the power element 34 will be bodily displaced from its position of Fig. 1 to thereby adjust the control point of the switch structure.

In the operation of the structure so far described, it will be understood that with a decrease in fluid pressure within the power element 34, the pin 33 will move upwardly, permitting the blade 27 to move the lever 34 counterclockwise, as viewed in Fig. 1. Such movement of the lever drives the thrust pin 31 inwardly to actuate the switch structure into closed-contacts position. Conversely, with an increase of fluid pressure within the power element 34, the lever 24 will be moved clockwise, as viewed in Fig. 1, to deactuate the switch structure. It should be noted that movement of the lever 24 in clockwise direction is resisted by the restoring force generated in the resilient blade 27 and is further resisted by the friction generated between the leg 27a and the case 10 as the blade slides along the case as a result of the pivotal movement of the lever 24. The biasing force exerted on the lever 24 thus has a non-linear, irregular characteristic which is particularly advantageous in the operation of the switch structure 28.

The casing is supported on a base plate 48, having generally rectangular configuration and shown in detail in Figs. 4, 5 and 6. The base plate is provided with parallel longitudinally extending ribs 48a. Adjacent its transverse center-line the base plate has integral flanges 49 extending upwardly therefrom, and the free ends of the flanges are turned sidewardly to provide tabs 51. Extending upwardly from opposite sides of the tabs 51 deformable members 52 are received within the slots 16 (Fig. 3) in the case 10. With the members 52 extending through the slots 16, the members 52 are deformed to thereby stake the case to the base plate, the case being supported by the tabs 51.

Rigidly sealed by welding or other suitable means, to the upper face of the base plate 48 is an upper plate 53 having transverse grooves 54 in the upper plate 53 evident from Fig. 4, the grooves 54 provide communication between the base plate ribs 48a to thereby form a cavity for confining a thermally expansive fluid indicated at 56 in Fig. 6. One of the grooves 54 in the upper plate 53 receives the capillary bore tube 36 which, referring to Fig. 1, may be seen to communicate with the interior of the power element 34.

One of the tabs 51 is apertured at 57 (Fig. 4) to register with an aperture 60 formed in the case 10 and shown in Fig. 3. The purpose of the apertures 60 and 57 is apparent in Fig. 8 where a bolt 58 passes therethrough and receives a nut 59 carried by a metal strap 61. The strap is shown in detail in Fig. 7, and, as may there be seen, is provided with slots 62 variously spaced along its length. As may be seen in Fig. 8, the strap 61 extends around a pipe, tube or the like, indicated at 63. The free end of the strap is anchored by extension of the tab 64 struck from the case 10 through the selected one of the apertures 62 in the tab.

In installing the structure, the nut 59 is threaded a short distance on the bolt 58 and the tab 64 extended through the selected strap aperture 62. The bolt 58 may then be drawn up to tighten the strap about the pipe 63 and to thereby clamp the convex side of the base plate ribs 48a into heat transfer relation with the outer surface of the pipe. When so arranged, any temperature variation of the fluid flowing through the pipe 63 will be reflected in the expansion or contraction of the fluid filling the cavity between the plates 48 and 53, the capillary tube 36 and the power element 34. The resulting increase or decrease of pressure in the power element serves to operate the switch structure as previously described.

It should be noted that the cavity provided by the ribs and grooves in the plates 48 and 53 has a relatively large surface area to volume ratio, thereby providing sensitive response. The strap 61 in anchored to the case adjacent the transverse center-line of the case so that there is a minimum of longitudinal distortion of the assembly as the strap is tightened. The ribs in the plates 48 and 53 serve not only to provide a large surface area to volume ratio fluid cavity but also serve to increase the rigidity of the assembly. While the assembly has been herein described as clamped on a curved surface, such as provided by a pipe or tube, it will be understood that the assembly might also be clamped upon a grill or other similar irregular or perforated surface.

While the invention has been disclosed and described in some detail in the drawings and foregoing description, they are to be considered as illustrative and not restrictive in character, as modifications may readily suggest themselves to persons skilled in this art and within the broad scope of the invention, reference being had to the appended claims.

The invention claimed is:

1. A clamp-on thermostat adapted to react to the temperature of a pipe or tube through which a fluid flows, said thermostat comprising a generally rectangular case, a housing supported within said case, a switch mounted within said housing and disposed adjacent the transverse center-line of said case, a fluid filled power element mounted within said housing, motion transmission means including a pivotally supported lever engaged by said power element and said switch for operation of the switch in response to expansion and contraction of said power element, a generally rectangular base plate having parallel, longitudinal ribs formed therein, the upper faces of said ribs being concave and the lower surface thereof being convex, integral flanges extending from opposite sides of said base plate and rigidly secured to said case, said flanges extending normal to the plane of said base plate and adjacent its transverse centerline to thereby support said case in spaced relation to said base plate, an upper plate sealed in overlying relation to said base plate and overlying the concave face of said base plate ribs, said upper plate having transverse grooves therein providing communication between said base plate ribs to thereby provide a fluid cavity, a capillary bore tube providing communication between said cavity and said power element, a thermally expansive fluid filling said cavity, tube and power element, and a strap secured at opposite ends to said base plate flanges for clamping the convex surface of said base plate ribs in heat transfer relation to a pipe or the like, whereby said switch is operated in response to changes in temperature of the thermally expansive fluid in said cavity.

2. A clamp-on thermostat adapted to react to the temperature of a pipe or tube through which a fluid flows, said thermostat comprising a generally rectangular case, a housing supported within said case, a switch mounted within said housing and disposed adjacent the transverse center-line of said case, a fluid filled power element mounted within said housing, motion transmission means for operation of the switch in response to expansion and contraction of said power element, a generally rectangular base plate having parallel, longitudinal ribs formed therein, the upper faces of said ribs being concave and the lower surface thereof being convex, flanges extending from opposite sides of said base plate and rigidly secured to said case, said flanges extending normal to the plane of said base plate and adjacent its transverse center-line to thereby support said case in spaced relation to said base plate, an upper plate sealed in overlying relation to said base plate and overlying the concave face of said base plate ribs, said upper plate having transverse grooves therein providing communication between said base plate ribs to thereby provide a fluid cavity, a capillary bore tube providing communication between said cavity and said power element, a thermally expansive fluid filling said cavity, tube and power element, and a strap secured at opposite ends to said base plate flanges for clamping the convex surface of said base plate ribs in heat transfer relation to a pipe or the like, whereby said switch is operated in response to changes in temperature of the thermally expansive fluid in said cavity.

3. A clamp-on thermostat adapted to react to the temperature of a supporting surface, said thermostat comprising a generally rectangular case, a housing supported within said case, a control means mounted within said housing and disposed adjacent the transverse center-line of said case, a fluid filled power element mounted within said housing, motion transmission means for operation of the control means in response to expansion and contraction of said power element, a generally rectangular base plate having ribs formed therein with concave faces and convex surfaces, flanges extending from opposite sides of said base plate and rigidly secured to said case, said flanges extending generally normal to the plane of said base plate and adjacent its transverse center-line to thereby support said case in spaced relation to said base plate, an upper plate sealed in overlying relation to said base plate and overlying the concave faces of said base plate ribs, said upper plate having grooves therein providing communication between said base plate ribs to thereby provide a fluid cavity, a capillary bore tube providing communication between said cavity and said power element, a thermally expansive fluid in said cavity, tube and power element, and a strap secured at opposite ends to said base plate flanges for clamping the convex surface of said base plate ribs in heat transfer relation to a supporting surface, whereby said control means is operated in response to changes in temperature of the supporting surface.

4. A clamp-on thermostat adapted to react to the temperature of a supporting surface, said thermostat comprising a case, a housing within said case, control means mounted within said housing, a fluid filled power element mounted within said housing, motion transmission means for operation of the control means in response to expansion and contraction of said power element, a base plate having ribs formed therein with concave and convex surfaces, flanges extending from opposite sides of said base plate and rigidly secured to said case, said flanges extending generally normal to the plane of said base plate to thereby support said case in spaced relation to said base plate, an upper plate sealed in overlying relation to said base plate and overlying concave surfaces of said base plate ribs, said upper plate having transverse grooves therein providing communication between said base plate ribs to thereby provide a fluid cavity, a capillary bore tube providing communication between said cavity and said power element, a thermally expansive fluid in said cavity, tube and power element, and a flexible strap secured at opposite ends to said base plate flanges for clamping the convex surface of said base plate ribs in heat transfer relation to a supporting surface, whereby said control means is operated in response to changes in temperature of the supporting surface.

5. A thermostatic switching mechanism comprising a housing, an enclosed switch structure mounted within said housing, a fluid-filled power element mounted within said housing, motion transmission means including a lever pivotally supported in said housing, said lever being engaged by said power element and said switch for operation of the switch in response to expansion and contraction of said power element, resilient means acting on said lever and resisting expansion of said power element, said resilient means comprising a spring blade having one end rigidly attached to said lever and its other end slidably engaging said housing and intermediate portion between the ends and extending from said one end generally toward the pivotal support of said lever to a point of engagement with said housing and thence generally away from the pivotal support to said other end, whereby pivotal movement of said lever upon expansion of said power element is resisted both by the restoring force generated in said blade and by the friction resisting sliding movement of said other end of said blade against said housing.

References Cited in the file of this patent
UNITED STATES PATENTS

| | | |
|---|---|---|
| 343,687 | Baulieu | June 15, 1886 |
| 1,429,923 | Bosse et al. | Sept. 26, 1922 |
| 2,901,578 | Noakes | Aug. 25, 1959 |